United States Patent [19]

Briant et al.

[11] 4,422,129

[45] Dec. 20, 1983

[54] HUMIDITY SENSOR

[75] Inventors: Jacqueline L. Briant; Jeffrey A. Asher, both of Schenectady, N.Y.

[73] Assignee: General Electric Company, Schenectady, N.Y.

[21] Appl. No.: 409,767

[22] Filed: Aug. 19, 1982

[51] Int. Cl.$^3$ .............................................. H01G 9/00
[52] U.S. Cl. ...................................... 361/433; 338/35
[58] Field of Search ....................... 252/62.2; 361/433; 338/35

[56] References Cited

U.S. PATENT DOCUMENTS

| | | | |
|---|---|---|---|
| 4,041,437 | 8/1977 | Matsuura | 338/35 |
| 4,049,891 | 9/1977 | Hong | 423/332 |
| 4,280,115 | 7/1981 | Farrington | 422/98 |
| 4,322,485 | 3/1982 | Harrison | 252/62.2 |

Primary Examiner—John F. Niebling

Attorney, Agent, or Firm—Jane M. Binkowski; James C. Davis, Jr.; James Magee, Jr.

[57] ABSTRACT

A humidity sensor which varies in electrical impedance with variations in humidity in the atmosphere in which it is placed comprising a ceramic body, at least a pair of spaced electrodes disposed on said ceramic body in electrical contact therewith, and an electrical contact on each said electrode, said ceramic body being an electrolyte comprised of $Na_{1+x}Si_xZr_2P_{3-x}O_{12}$, where x has a value ranging from 1.5 to 2.8, said ceramic body having a density of at least about 90% of the theoretical density for said $Na_{1+x}Si_xZr_2P_{3-x}O_{12}$, each said electrode being in the form of a continuous interconnecting network which forms at least a sufficient plurality of non-linear recesses with the surface of the ceramic body exposing said ceramic body surface to said atmosphere to produce a measurable electrical impedance change when said atmosphere varies in relative humidity.

10 Claims, 5 Drawing Figures

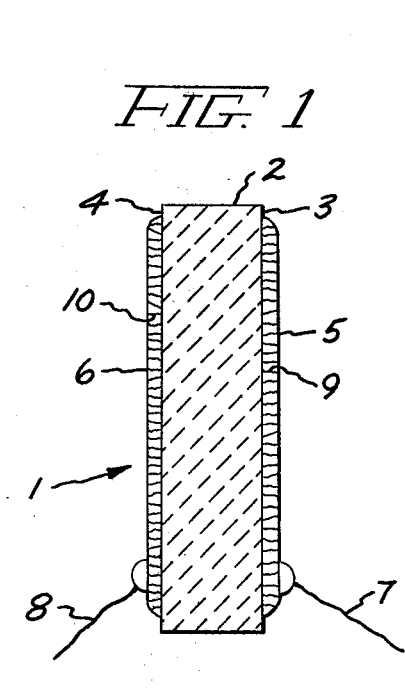
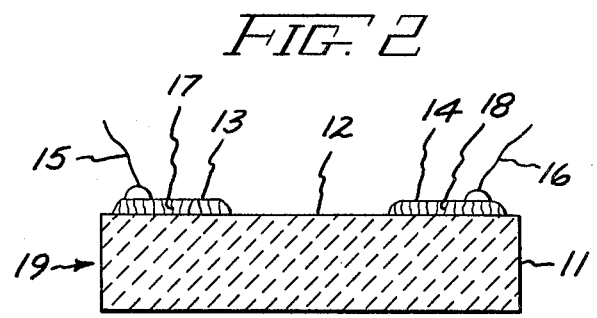
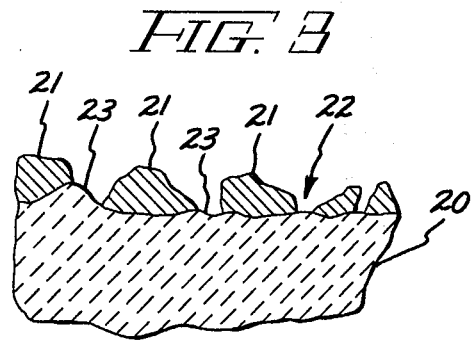
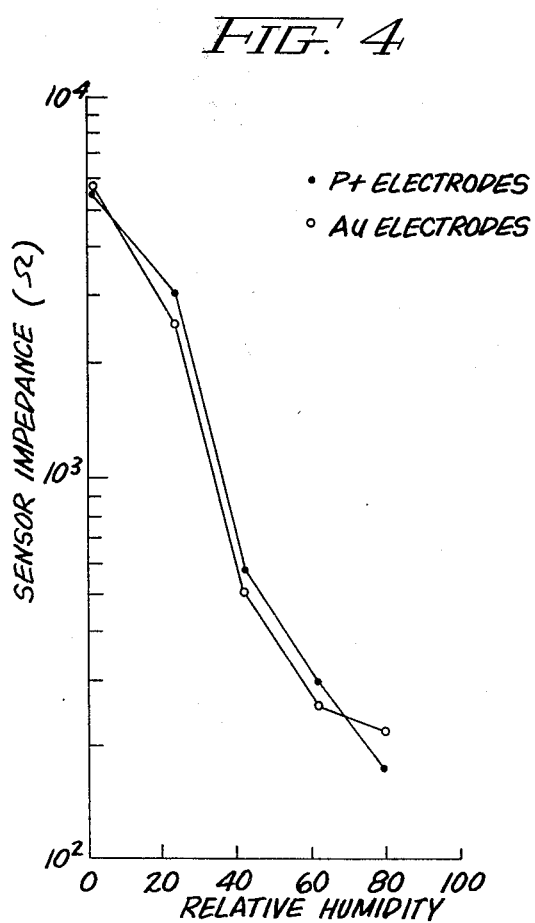
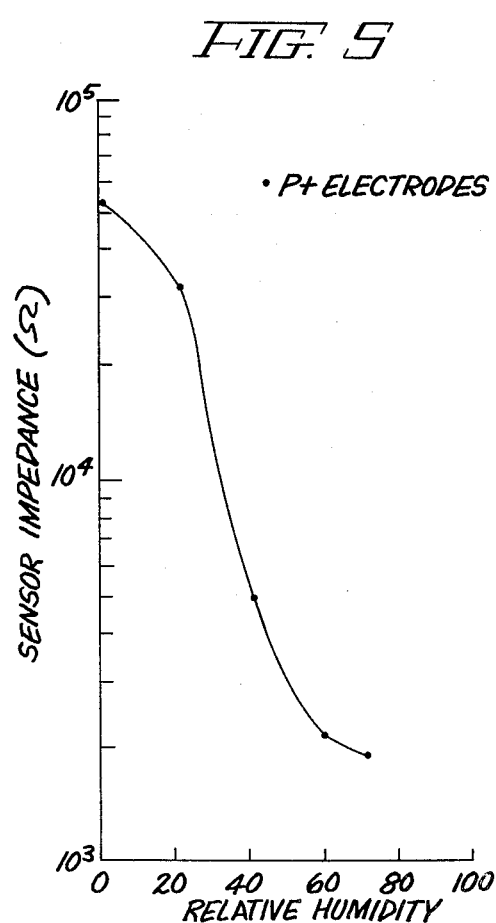

HUMIDITY SENSOR

This invention relates to a humidity sensor which varies in electrical impedance with variations in humidity.

The object of the invention is to provide a simple and reliable means of continuously monitoring water vapor concentrations in gases.

There are many unfilled needs for inexpensive and reliable humidity sensors. Major appliance applications include moisture monitoring in microwave ovens, air conditioners, clothes driers, refrigerators, and heat pumps. The device could also be marketed separately to measure room humidity in homes, museums, and industrial and commercial building.

U.S. Pat. No. 4,280,115 for HUMIDITY SENSOR to Farrington, assigned to the assignee hereof and incorporated herein by reference, discloses a humidity sensor responsive to changes in atmospheric water content by changes in sensor impedance which consists essentially of a non-porous, water impervious ionic-conductive beta-alumina substrate, at least a pair of spaced apart, thin electrodes mounted on at least one major surface of the substrate, and an electrical lead in contact with each of the electrodes.

Briefly stated, the present invention is directed to a humidity sensor which varies in electrical impedance with variations in humidity in the atmosphere, vacuum or partial vacuum in which it is placed comprising a ceramic body, at least a pair of spaced electrodes disposed on said ceramic body in electrical contact therewith, and an electrical contact in electrical contact with each said electrode, said ceramic body being an electrolyte comprised of $Na_{1+x}Si_xZr_2P_{3-x}O_{12}$, where x has a value ranging from about 1.5 to about 2.8, said ceramic body having a density ranging from about 90% to about 100% of the theoretical density for said $Na_{1+x}Si_xZr_2P_{3-x}O_{12}$, each said electrode being in the form of a continuous interconnecting network which forms at least a sufficient plurality of non-linear recesses with the surface of the ceramic body exposing said ceramic body surface to said atmosphere, vacuum or partial vacuum to produce a measurable electrical impedance change when said atmosphere, vacuum or partial vacuum varies in relative humidity.

Relative humidity is defined herein as the ratio of the quantity of water vapor actually present in any volume of any atmosphere, vacuum or partial vacuum, to the quantity required to saturate the same volume of atmosphere, vacuum or partial vacuum at the same temperature. Ordinarily, the atmosphere is air.

Those skilled in the art will gain a further and better understanding of the present invention from the detailed description set forth below, considered in conjunction with the figures accompanying and forming a part of the specification in which:

FIG. 1 is a schematic cross-sectional view of one embodiment of the present invention showing the present humidity sensor;

FIG. 2 is a schematic cross-sectional view of a second embodiment of the present humidity sensor;

FIG. 3 is a schematic enlarged view of a portion of an embodiment of the present sensor showing the present microscopic recesses in the continuous interconnecting electrode exposing the surface of the ceramic body;

FIG. 4 is a pair of graphs showing sensor impedance in ohms ($\Omega$) vs. relative humidity (RH) at a temperature of 31° C. for two of the present sensors where both utilized a ceramic wafer but one had a Pt electrode on each wafer face and the other had a gold electrode on each wafer face; and FIG. 5 is a graph showing impedance in ohms ($\Omega$) vs. relative humidity (RH) at 32° C. for the present humidity sensor formed of a ceramic wafer with a pair of spaced Pt electrodes on one face.

Specifically, FIG. 1 shows the present humidity sensor 1 with the ceramic electrolyte body in the form of wafer 2 with opposing major surfaces or faces 3 and 4. Electrode 5 in the form of a continuous interconnecting network is in direct contact with and supported by surface 3. Electrode 6 in the form of a continuous interconnecting network is in direct contact with and supported by surface 4. The electrodes form non-linear recesses 9 and 10 with surfaces 3 and 4, respectively. Electrical contact 7 is in electrical contact with electrode 5, and electrical contact 8 is in electrical contact with electrode 6. When desirable, a water-permeable membrane can enclose the humidity sensor 1 to protect it from air-borne contaminants.

FIG. 2 shows another embodiment of the present invention. Specifically, FIG. 2 shows humidity sensor 19 wherein the ceramic body 11 has major surface 12 with electrode 13 in the form of a continuous interconnecting network in electrical contact with one portion of surface 12, electrode 14 in the form of a continuous interconnecting network in electrical contact with another portion of surface 12, electrical contact 15 on electrode 13 and electrical contact 16 on electrode 14. Electrodes 13 and 14 form non-linear recesses 17 and 18 with surface 12.

FIG. 3 shows an enlarged portion of an embodiment of the present sensor showing ceramic body 20 in electrical contact with continuous interconnecting electrode 21 which forms non-linear recesses 22 with the ceramic body exposing the surface 23 of ceramic body 20 to the atmosphere.

The present polycrystalline ceramic body is comprised of $Na_{1+x}Si_xZr_2P_{3-x}O_{12}$, where x has a value ranging from about 1.5 to 2.8. Electrical conductivity is maximum when x has a value ranging from about 1.6 to about 2.4, and therefore, a ceramic body of this composition is preferred. The ceramic body has the same composition as that of the powder from which it is formed, or its composition does not differ significantly therefrom. Preferably, the powder is compacted to the desired size and shape, and the resulting compact is fired to the present density.

U.S. Pat. No. 4,049,891 to Hong et al, incorporated herein by reference, discloses the preparation of the present $Na_{1+x}Si_xZr_2P_{3-x}O_{12}$ powder and also the present ceramic body formed from such powder.

Specifically, U.S. Pat. No. 4,049,891 discloses that these compositions are prepared by reacting the constituent reactants either in the solid or liquid state, that the reactants utilized comprise the oxides and/or salts of the cations that are reducible to the oxides under the reaction conditions of temperature and pressure employed, that in one representative procedure, the starting materials in particulate solid form are heated to a sintering temperature for a period of time to assure conversion to a product wherein the anions and the cations are bonded to oxygen atoms to form the tetrahedral or tetrahedral-octahedral crystalline structure, that for example, the solid mixture is heated stepwise to decompose the least thermally stable reactant such as NH$_4$H$_2$PO$_4$ at about 170° C. and then heating at an elevated temperature of about 900° C. to decompose the Na$_2$CO$_3$ and then at a highly elevated temperature of about 1200° C. to 1600° C. to transform the reactants, which form the desired crystalline structure, that the period of heating depends upon the amount of reactants with a representative time period being between about 4 hours and 24 hours, and that when forming a ceramic structure from these compositions, a flux material can be added to the reactants and reacted therewith by any means well-known in the art.

Example I of U.S. Pat. No. 4,049,891 illustrates the formation of the compound with the chemical formula Na$_{1-x}$Zr$_2$Si$_x$P$_{3-x}$O$_{12}$, wherein x ranges from 0.4 to 2.8. Specifically, Example I of this patent discloses that mixtures of $\frac{1}{2}$(1+x)Na$_2$CO$_3$, 2ZrO$_2$, ×SiO$_2$ and (3−x) NH$_4$H$_2$PO$_4$ wherein $0.4 \leq x \leq 2.8$ were heated to 170° C. for about 4 hours to decompose NH$_4$H$_2$PO$_4$, then at 900° C. for about 4 hours to decompose Na$_2$CO$_3$, and then at 1200° C. for about 8 hours, that the heated mixtures were then allowed to cool to room temperature, and that the compounds Na$_{1+x}$Zr$_2$Si$_x$P$_{3-x}$O$_{12}$, $0 \leq x \leq 3$, all had rhombohedral R3c structures, except in the range $1.8 \leq x \leq 2.2$ where a distortion to the monoclinic C2/c space group is found at room temperature.

Example I of U.S. Pat. No. 4,049,891 further discloses that in order to obtain dense ceramic disks of compositions in the system Na$_{1+x}$Zr$_2$P$_{3-x}$Si$_x$O$_{12}$, appropriate mixtures of Na$_2$CO$_3$, ZrO$_2$, SiO$_2$ and NH$_4$H$_2$PO$_4$ were heated for 4 hours at 170° C. (to decompose the NH$_4$H$_2$PO$_4$) and calcined at 900° C. for 16 hours, that the product was cold-pressed at 80,000 psi after the addition of polyethylene glycol as a binder, that the cold-pressed pellets were fired for 6 to 16 hours at temperatures of 1200° to 1400° C., that the firing temperature of Na$_3$Zr$_2$Si$_2$PO$_{12}$, for example, was 1250° C., since at 1275° C. there was appreciable decomposition of the specimen, and that densities as high as 94% were obtained by this method.

The present ceramic polycrystalline body is an ion-conducting electrolyte having a density ranging from about 90% to about 100% of the theoretical density for the present Na$_{1+x}$Si$_x$Zr$_2$P$_{3-x}$O$_{12}$. Preferably, for best results, the ceramic body is of the highest density. This ceramic is particularly useful as the electrolyte for the present humidity sensor because of its low resistivity and because its resistivity does not degrade on exposure to humidity.

The ceramic body can have a number of forms such as, for example, a disk, wafer or bar. In one embodiment of the present invention, it has a major surface or face on which at least a pair of spaced electrodes can be disposed. In another embodiment, the ceramic body has a pair of opposed major surfaces or faces with an electrode disposed on each major surface. The surface of the ceramic body on which the electrodes are disposed can be smooth or rough.

The ceramic body ranges in thickness from about 100 microns to about 2 centimeters. A ceramic body with a thickness less than about 100 microns could not be self-supporting as in FIG. 1. Furthermore, it would have too high an electrical resistance to make it useful in the configuration of FIG. 2. On the other hand, a ceramic body with a thickness greater than about 2 centimeters is likely to have an electrical resistance too high to make it useful in the present sensor. Its particular thickness depends largely on its particular application. Generally, for best results the ceramic body has a thickness ranging from about 0.5 millimeter to about 2 millimeters.

If desired the ceramic body can be disposed on or supported by a suitable substrate which has no significant deleterious effect on it as a humidity sensor.

The ceramic body has at least a pair of spaced electrodes disposed on its surface in electrical contact therewith. The electrodes are electron conducting and can be metal or non-metal. Representative of the present electrodes are platinum, gold, elemental non-diamond carbon, tin oxide and ruthenium oxide.

Ordinarily, the present electrodes extend over from about 3% to about 95% of the surface of the ceramic body, and preferably, for most applications, the electrodes extend over from about 15% to about 70% of the surface of the ceramic body. To the eye the present electrode appears continuous. However, under a microscope it is seen as a continuous interconnecting network with openings therein exposing the ceramic substrate.

The electrodes range in thickness from about 10 Å to about 10,000 Å. An electrode with a thickness less than about 10 Å is not likely to form an interconnecting network whereas one thicker than about 10,000 Å provides no advantage. Preferably, the electrodes have a thickness ranging from about 100 Å to about 1,000 Å. Also, preferably, the electrodes in one sensor are of substantially the same size.

The electrodes can be disposed on the surface of the ceramic body by a number of conventional techniques which can deposit the electrodes to the desired thickness and in the form of a continuous microscopically interconnecting network with openings extending to the surface of the ceramic body exposing such surface to the atmosphere forming microscopic recesses therewith which are significantly or substantially non-linear, i.e., curved or jagged. Normally, the present microscopically interconnecting network is formed during the course of the deposition either by the roughness of the ceramic surface or by the thinness of the electrode being deposited. Representative of the techniques useful for depositing the present electrodes are sputtering and vapor deposition. At least a sufficient plurality of such microscopic non-linear recesses should be formed in the deposited electrodes to produce a measureable electrical impedance change when the atmosphere or vacuum varies in relative humidity. The openings in the deposited electrodes, which usually are in the form of a continuous interconnecting film, can have a number of forms such as breaks or pores.

Since water vapor in a gas or atmosphere with a relative humidity of less than 100% will not condense on a smooth flat surface, the more non-smooth or non-linear the surface portion of the recesses in the electrodes, the more readily water vapor from the atmosphere will condense therein, forming pockets of water which are simultaneously in contact with the electrode and the ceramic surface. When the present sensor is connected to an external circuit, such as an AC source, under dry conditions, i.e. essentially zero humidity, the interface between the ceramic surface and the electrodes polarizes and no current passes. When the atmosphere has a low relative humidity, for example less than about 2%, very low current flows. However, when the relative humidity is higher, usually at least about 2%, pockets of water form in the recesses and current flows giving a measurable electrical impedance change which varies with the relative humidity in the atmosphere. It is believed that there is an ion exchange between the water and $Na^+$ in the ceramic forming hydronium ion ($H_3O^+$) in the surface portion of the ceramic and NaOH in solution in the pockets of water. Also, an electrochemical reaction occurs between the electrode and NaOH solution and thus current passes from one electrode to the other.

The AC impedance of the present sensor decreases with increasing relative humidity at suitable measuring frequencies. The frequency should be low enough so that the interfacial impedance is significant compared to the bulk resistance or impedance of the ceramic body so that a significant change in total impedance is observed. Generally, although a suitable frequency will depend largely on the particular geometry of the present humidity sensor, it has been found that a frequency ranging from about 10 Hertz to about 1,000 Hertz is suitable.

The invention is further illustrated by the following examples:

EXAMPLE 1

In this example, the present humidity sensor was produced using Pt electrodes.

A polycrystalline ceramic body composed of $Na_{1+x}Si_xZr_2P_{3-x}O_{12}$, where x had a value of about 2.4, was used in this example. It had a density of about 95% to 96% and was in the form of a wafer about 1.5 mm thick, about 10 mm in length and about 5 mm in width. The opposing surfaces, i.e. faces, were prepared by sanding and cleaning in isopropanol producing wafer faces which were macroscopically smooth but microscopically rough.

A platinum electrode film was sputter deposited on each wafer face to a thickness of about 500 Å. The sputter deposition produced an electrode film in the form of a continuous interconnecting network which extended substantially entirely over both wafer faces. Each electrode had a plurality of openings therein which were in the form of pores or breaks. Optical examination showed that throughout each electrode most of the openings extended to the surface of the wafer forming microscopic recesses therewith exposing the surface of the wafer to the atmosphere and that these recesses were non-linear or substantially non-linear, i.e. curved or jagged.

An electrical contact was placed in contact with each electrode and connected to a 60 Hertz AC circuit to measure impedance.

The sensor was mounted within a jar which was maintained at 31° C. through which the test gas could be flowed and then vented to air. The test gas was a continuous air stream with a relative humidity which was varied over the course of the run. Changes in the impedance of the sensor with variations in relative humidity were determined.

The results are illustrated in FIG. 4 which shows a change in impedance over an order of magnitude. Specifically, FIG. 4 shows that the AC impedance of the present humidity sensor decreased with increasing relative humidity.

EXAMPLE 2

In this example, the present humidity sensor was produced with a ceramic wafer of the same composition and density as disclosed in Example 1 and gold electrodes.

The procedure used in this example was substantially the same as that set forth in Example 1 except that the ceramic wafer measured 10.63 mm in length, 4.88 mm in width and 1.57 mm in thickness, and that gold was sputtered onto the wafer faces to a thickness of 500 Å producing continuous interconnecting electrode films extending over both wafer faces.

Optical examination showed that throughout each electrode most of the openings extended to the surface of the wafer forming microscopic recesses therewith exposing the surface of the wafer to the atmosphere and that these recesses were non-linear or substantially non-linear, i.e. curved or jagged.

An electrical contact was placed in contact with each electrode and connected to a 60 Hertz AC circuit to measure impedance. Testing of the sensor was carried out as disclosed in Example 1.

The results are also illustrated in FIG. 4 which shows a change in impedance of an order of magnitude for this sensor, and specifically, it shows that the AC impedance of the humidity sensor decreased with increasing relative humidity.

EXAMPLE 3

In this example, the present humidity sensor was produced by depositing a pair of spaced Pt electrodes on one face of the ceramic wafer. The ceramic wafer had the same composition and density as disclosed in Example 1.

The procedure used in this example was substantially the same as that set forth in Example 1 except that the ceramic wafer measured 10.39 mm in length, 4.99 mm in width and 1.59 mm in thickness. The Pt electrodes were sputtered onto one face of the wafer with each electrode extending over approximately $\frac{1}{3}$ of the surface of the face.

Optical examination showed that throughout each electrode most of the openings extended to the surface of the wafer forming microscopic recesses therewith exposing the surface of the wafer to the atmosphere and that these recesses were non-linear or substantially non-linear, i.e. curved or jagged.

An electrical contact was placed in contact with each electrode and connected to a 60 Hertz AC circuit to measure impedance. Testing of the sensor was carried out at 32° C. as disclosed in Example 1.

The results are illustrated in FIG. 5 which shows a change in impedance over an order of magnitude for this sensor, and specifically, it shows that the AC impedance of the sensor decreased with increasing humidity.

Although the present sensor has been disclosed with respect to humidity variations in an atmosphere or vacuum, it could also be useful for detecting or measuring the water content of an organic liquid. In this embodiment of the present invention, the sensor would vary in electrical or AC impedance with variations in the water content in an organic liquid in which it is placed and would be comprised of a ceramic body, at least a pair of spaced electrodes disposed on said ceramic body in electrical contact therewith, and an electrical contact on each said electrode, said ceramic body being an electrolyte comprised of $Na_{1+x}Si_xZr_2P_{3-x}O_{12}$, where x has a value ranging from 1.5 to 2.8, said ceramic body having a density of at least about 90% of the theoretical density for said $Na_{1+x}Si_xZr_2P_{3-x}O_{12}$, each said electrode being in the form of a continuous microscopically interconnecting network which forms at least a sufficient plurality of microscopic non-linear recesses with the surface of the ceramic body exposing said ceramic body surface to said liquid to produce a measurable change in electrical impedance when the sensor is immersed in said organic liquid. Also, the organic liquid should have no significant deleterious effect on the sensor.

In another embodiment of the present invention, the present sensor could be enclosed in a membrane permeable to water vapor only, and the resulting device could be immersed in an organic or inorganic liquid to determine the water content of such liquid. This device would be especially useful for determining the water content of inorganic liquids such as sulfuric acid in a lead acid battery. Specifically, this device varies in electrical impedance with variations in the water content in a liquid in which it is placed, said device being comprised of a humidity sensor enclosed in a membrane permeable to water vapor only, said sensor comprising a ceramic body, at least a pair of spaced electrodes disposed on said ceramic body in electrical contact therewith, and an electrical contact on each said electrode, said ceramic body being an electrolyte comprised of $Na_{1+x}Si_xZr_2P_{3-x}O_{12}$, where x has a value ranging from 1.5 to 2.8, said ceramic body having a density of at least about 90% of the theoretical density for said $Na_{1+x}Si_xZr_2P_{3-x}O_{12}$, each said electrode being in the form of a continuous interconnecting network which forms at least a sufficient plurality of non-linear recesses with the surface of the ceramic body exposing said ceramic body surface to the water content in said liquid by means of said membrane to produce a measurable electrical impedance change when said device is immersed in said liquid.

What is claimed is:

1. A humidity sensor which varies in electrical impedance with variations in humidity in the atmosphere, vacuum or partial vacuum in which it is placed consisting essentially of a ceramic body ranging in thickness from about 100 microns to about 2 centimeters, at least a pair of spaced electrodes disposed on said ceramic body in electrical contact therewith, and an electrical contact on each said electrode, said ceramic body being an electrolyte comprised of $Na_{1+x}Si_xZr_2P_{3-x}O_{12}$, where x has a value ranging from about 1.5 to about 2.8, said ceramic body having a density ranging from about 90% to about 100% of the theoretical density for said $Na_{1+x}Si_xZr_2P_{3-x}O_{12}$, each said electrode having a minimum thickness of about 10 Å and being in the form of a continuous interconnecting network which forms at least a sufficient plurality of non-linear recesses with the surface of the ceramic body which expose ceramic body surface to said atmosphere, vacuum or partial vacuum and produce a measurable electrical current impedance change when said atmosphere, vacuum or partial vacuum varies in relative humidity, said electrodes extending over from about 3% to about 95% of the surface of said ceramic body.

2. The sensor according to claim 1 where x has a value ranging from 1.6 to 2.4.

3. The sensor according to claim 1 where the electrodes are selected from the group consisting of noble metal, elemental carbon, tin oxide and ruthenium oxide.

4. The sensor according to claim 3 wherein said noble metal is selected from the group consisting of platinum and gold.

5. The sensor according to claim 1 wherein the ceramic body has a major surface on which said pair of spaced electrodes are disposed.

6. The sensor according to claim 1 wherein said ceramic body has a pair of opposed major surfaces with one of said electrodes disposed on each said opposed surfaces.

7. A humidity sensor which varies in electrical impedance with variations in humidity in the atmosphere in which it is placed consisting essentially of a ceramic body ranging in thickness from about 0.5 millimeters to about 2 millimeters, at least a pair of spaced electrodes disposed on said ceramic body in electrical contact therewith, and an electrical contact on each said electrode, said ceramic body being an electrolyte comprised of $Na_{1+x}Si_xZr_2P_{3-x}O_{12}$, where x has a value ranging from about 1.6 to about 2.4, said ceramic body having a density ranging from about 90% to about 100% of the theoretical density for said $Na_{1+x}Si_xZr_2P_{3-x}O_{12}$, each said electrode ranging in thickness from about 100 521 to about 1000 521 and being in the form of a continuous interconnecting network which forms at least a sufficient plurality of non-linear recesses with the surface of the ceramic body which expose ceramic body surface to said atmosphere and produce a measurable electrical impedance change when said atmosphere varies in relative humidity, said electrodes extending over from about 15% to about 70% of the surface of said ceramic body.

8. The sensor according to claim 7 wherein said atmosphere is air.

9. A sensor which varies in electrical impedance with variations in the water content in an organic liquid in which it is placed consisting essentially of a ceramic body ranging in thickness from about 100 microns to about 2 centimeters, at least a pair of spaced electrodes disposed on said ceramic body in electrical contact therewith, and an electrical contact on each said electrode, said ceramic body being an electrolyte comprised of $Na_{1+x}Si_xZr_2P_{3-x}O_{12}$, where x has a value ranging from 1.5 to 2.8, said ceramic body having a density of at least about 90% of the theoretical density for said $Na_{1+x}Si_xZr_2P_{3-x}O_{12}$, each said electrode having a minimum thickness of about 10 Å and being in the form of a continuous interconnecting network which forms at least a sufficient plurality of non-linear recesses with the surface of the ceramic body which expose ceramic body surface to said liquid and produce a measurable electrical impedance change when said sensor is immersed in said organic liquid, said electrodes extending over from about 3% to about 95% of the surface of said ceramic body, said organic liquid having no significant deleterious effect on said sensor.

10. A device which varies in electrical impedance with variations in the water content in a liquid in which it is placed said device consisting essentially of a humidity sensor enclosed in a membrane permeable to water vapor only, said sensor consisting essentially of a ceramic body ranging in thickness from about 100 microns to about 2 centimeters, at least a pair of spaced electrodes disposed on said ceramic body in electrical contact therewith, and an electrical contact on each said electrode, said ceramic body being an electrolyte comprised of $Na_{1+x}Si_xZr_2P_{3-x}O_{12}$, where x has a value ranging from 1.5 to 2.8, said ceramic body having a density of at least about 90% of the theoretical density for said $Na_{1+x}Si_xZr_2P_{3-x}O_{12}$, each said electrode having a minimum thickness of about 10 Å and being in the form of a continuous interconnecting network which forms at least a sufficient plurality of non-linear recesses with the surface of the ceramic body which expose ceramic body surface to the water content in said liquid by means of such membrane only and which produce a measurable electrical impedance change when said device is immersed in said liquid, said electrodes extending from about 3% to about 95% of the surface of said ceramic body.

* * * * *